July 2, 1929. P. J. McINERNEY Re. 17,361
ART OF BUILDING CONCRETE SURFACING STRUCTURES
Original Filed Jan. 29, 1925 3 Sheets-Sheet 1
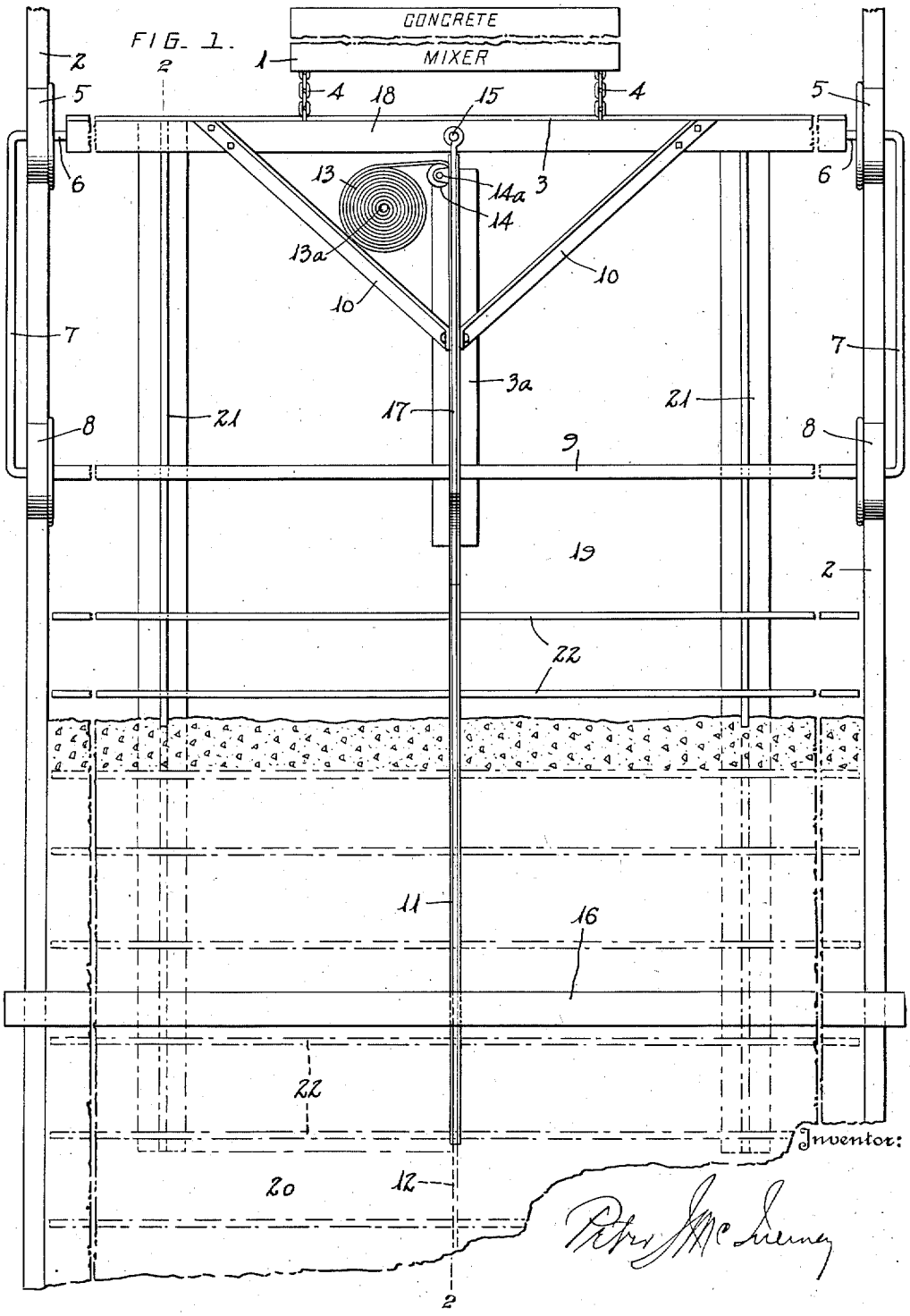
Inventor:
Peter J. McInerney ART OF BUILDING CONCRETE SURFACING STRUCTURES
Original Filed Jan. 29, 1925 3 Sheets-Sheet 2
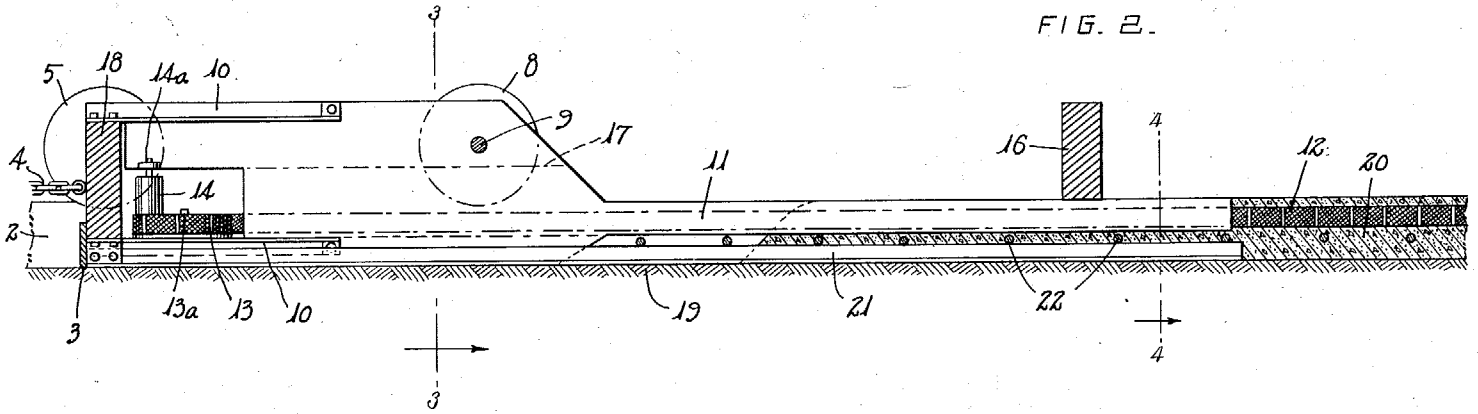
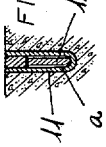
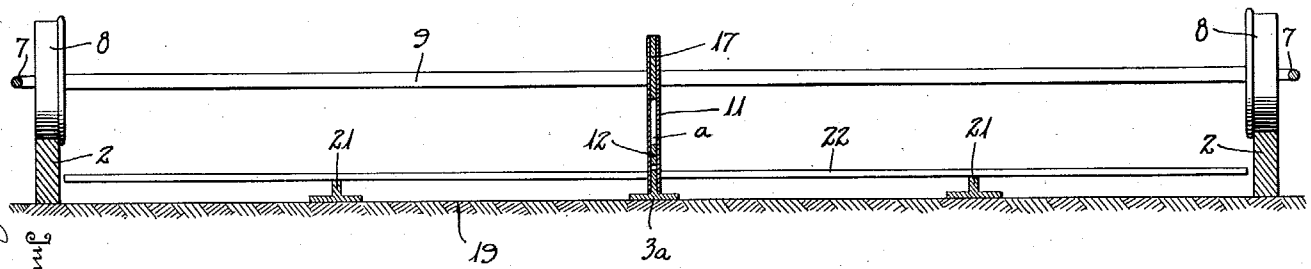
Inventor:
Peter J. McInerney ART OF BUILDING CONCRETE SURFACING STRUCTURES
Original Filed Jan. 29, 1925 3 Sheets-Sheet 3
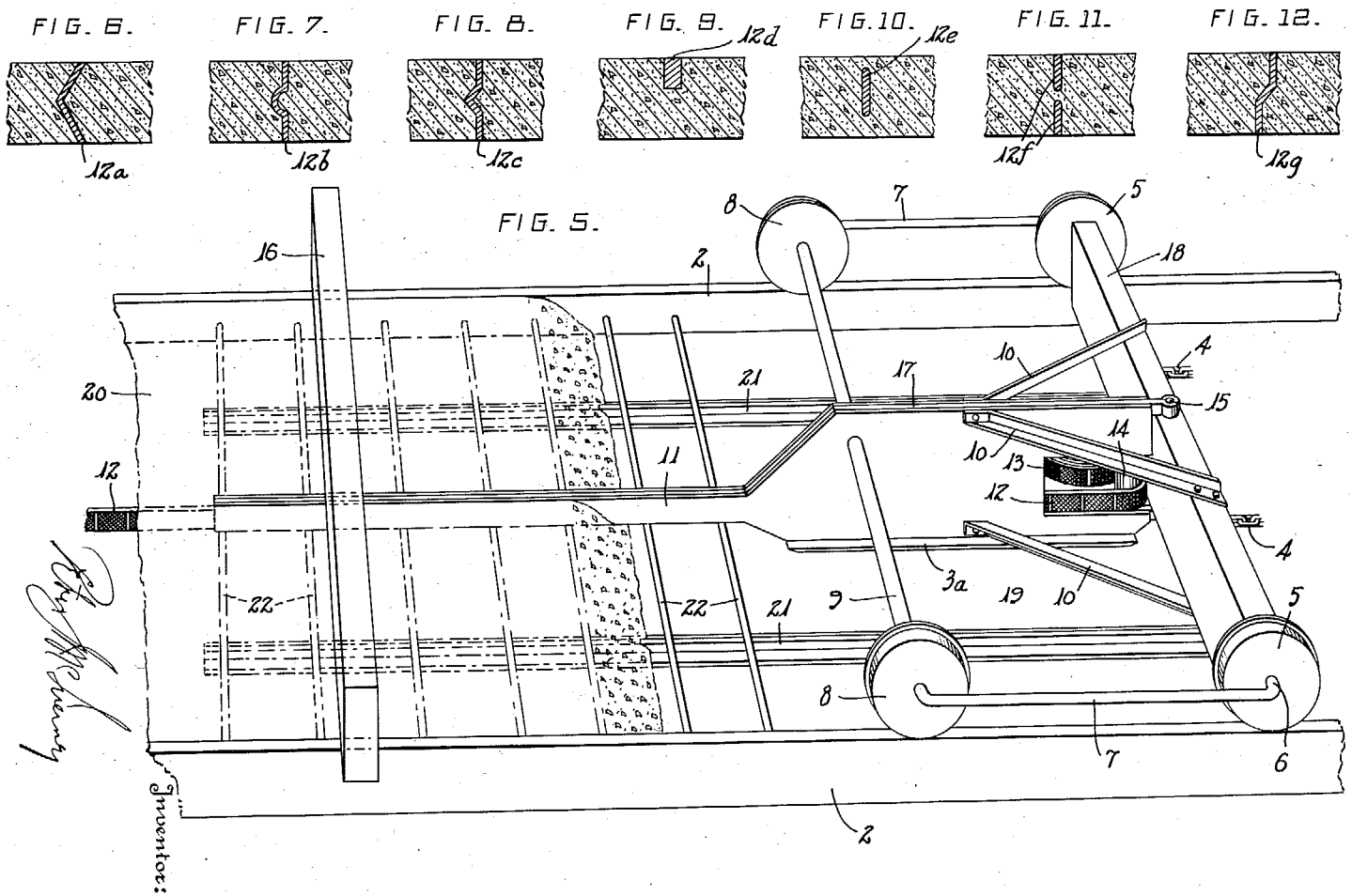

Reissued July 2, 1929. Re. 17,361

UNITED STATES PATENT OFFICE.

PETER J. McINERNEY, OF DALLAS, TEXAS, ASSIGNOR, BY MESNE ASSIGNMENTS, TO JOHN N. HELTZEL, OF WARREN, OHIO.

ART OF BUILDING CONCRETE SURFACING STRUCTURES.

Original No. 1,634,262, dated July 5, 1927, Serial No. 5,539, filed January 29, 1925. Application for reissue filed May 23, 1928. Serial No. 280,086.

This invention relates to an apparatus and process for mechanically producing joints or placing parting lines, patterns, markings and designs in plastic and semi-solid substances, such as asphalt, concrete or other matrices, more particularly for providing cleavage planes in highways, pavements, walks, roofs, floors or other construction of a like nature.

Another object is to position reinforcement means in the concrete surfacing structure, to resist the expansion and contraction forces after the material has set.

An object of the invention is the provision of an apparatus and method for marking or cleaving the matrix, so that when possible separation of the latter takes place, it will occur along the cleavage plane or line.

Another object is to provide such an apparatus and method that will form the cleavage plane or line before the material has attained a mechanical set.

A further object is the provision of an apparatus and method of the character indicated which are simple and economical.

The invention is of advantage in eliminating destructive and unsightly fissures or cracks in the material, the separation, if it occurs, being along the cleavage plane or line produced by the present apparatus and process. It is also possible to provide for hinge joints between the sections or slabs of the structure.

Another object is the movement of a blade or joint producing member in the plastic material to form a separation or division of the material in a simple and effective manner.

A further object is the provision of such a blade or member from which a strip or other suitable material may be delivered, either to remain in the fissure formed by the blade or member, or to be removed and used repeatedly.

It is also an object of the invention to incorporate in the apparatus a sub-grader, and finishing means for the surface of the material, in order that the sub-grade may be graded in advance of the point where the material is delivered on the sub-base, and the material finished over the joint producing blade or member.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the apparatus, portions being broken away.

Fig. 2 is a longitudinal vertical section on the line 2—2 of Fig. 1.

Fig. 3 is a cross section taken on the line 3—3 of Fig. 2.

Fig. 4 is a sectional detail taken on the line 4—4 of Fig. 2.

Fig. 5 is a perspective view of the apparatus.

Figs. 6, 7, 8, 9, 10, 11 and 12 are cross sections of different forms of joints or divisions that may be produced.

The apparatus is trailed from a portable concrete mixer 1 which moves on the subgrade 19 between the side forms or rails 2 between which the highway, pavement or other surfacing structure is built.

A transverse beam or member 18 is disposed between the forms 2 and is connected with the mixer 1 by the chains 4 or other suitable coupling means, so that the apparatus is pulled forwardly with the mixer.

A subgrade template 3 is carried by the beam 18 to smooth the subgrade as the beam 18 is moved forwardly.

Wheels 5 are provided at the ends of the beam 18 to roll on the forms 2, and are mounted on the axles or shafts 6 connected with the ends of the beam 18, and connected by yokes 7 with the ends of a transverse rod 9 in rear of the beam 18. Wheels 8 are rotatable on the terminals of the rod 9 to move on the forms 2. The beam 18, rod 9, wheels 5 and 8 and yokes 7 constitute a carriage movable on the side forms or rails.

The joint producing blade or member 11 is disposed longitudinally and is composed of steel or other suitable material. The blade is hollow, and as shown is flat in a vertical plane.

The forward end portion of the blade is of increased height, and has a shoe or runner $3^a$ to ride on the sub-base, and the forward end of the blade is connected, as at 15, to the beam 18. In order to prevent the blade from swinging sidewise, braces 10 may be provided between the blade and beam.

A tape, ribbon or strip 12, which may be of jointed material, passes rearwardly through the passage of the blade 11, and is unwound from a roll or spool 13 mounted at one side of the forward portion of the blade on a spindle or shaft $13^a$. The tape or strip passes from the roll 13 across a guide roller 14 mounted on a shaft $14^a$ at the forward end of the blade. From the roller 14 the tape or strip passes rearwardly through the blade and is delivered from the rear end of the blade.

As shown, the blade is composed of side plates connected at their lower edges and having a strip or plate 17 secured between their upper edge portions.

As shown in Figs. 2, 4 and 5, the tail portion of the blade extends rearwardly into the plastic concrete or other material 20, with the upper edge of the blade substantially flush with the finished surface, and the tape or strip 12 below such surface.

The finisher 16, which may be of any suitable kind, operates on the surface of the material over the upper edge of the blade.

Runners 21 of T-shaped cross section are disposed between the blade 11 and side forms 2 and trail from the beam 18, to support reinforcement or reinforcing rods 22.

In operation, the reinforcing rods 22 are placed on the runners 21 under the tail portion of the blade 11, and the concrete or other material is poured on the sub-base over said rods and tail portion of the blade. The material is finished by the finisher 16, and the apparatus is then pulled forwardly with the concrete mixer 1 that serves as tractive means for the apparatus. The forward movement of the apparatus is stopped before the rear end of the blade is withdrawn from the finished material, and the operation is then repeated by placing additional reinforcing rods on the runners and pouring and finishing the material. The building of the road or other surfacing structure thus progresses with practically a continuous operation.

The blade 11 divides the material to produce a groove, incision or separation therein, and the tape or strip 12 is deposited in the material, in order to control the fracturing of the material, after it has hardened, along the line of the tape or strip.

The reinforcing rods 22 are supported by the runners 21 so as to be embedded in the material between the sub-base and surface, said runners being withdrawn from the concrete, so as to leave the rods properly placed in the finished material.

The tape or strip 12 may be treated with a non-volatile oil or grease, so as not to adhere to the material 20, thereby permitting the strip to be removed subsequently, for repeated use, thereby leaving a groove in the structure.

Various kinds of reinforcement may be placed on the runners 21 to be embedded in the material.

This method of building a road or other surfacing structure provides for practically continuous as well as convenient and economical operation, the joint, demarkation, groove, or the like, being produced inexpensively as the structure is built and finished.

The blade 11 may be used, without the strip 12, to produce a groove in the material, into which groove joint material may be deposited.

Various forms of joints may be produced, as indicated at $12^a$, $12^b$, $12^c$, $12^d$, $12^e$, $12^f$ and $12^g$ in Figs. 7, 8, 9, 10, 11 and 12, respectively, suitable blades being used for that purpose. As shown in Fig. 11 two strips or tapes may be deposited by the use of vertically spaced blades, and various arrangements and forms of blades may be used according to the work to be done.

Figs. 6, 7 and 8 show joints providing for hinge action between the sections or slabs. Fig. 9 shows the joint strip or material flush with the surface of the concrete or other material, while Fig. 10 shows the strip $12^e$ slightly below the surface, as in Figs. 2 and 5. Fig. 11 shows spaced strips $12^f$ extending to the sub-base and surface, while Fig. 12 shows a joint strip or member $12^g$ having its upper and lower edge portions offset to provide a step arrangement.

What is claimed is:

1. In a combination grooving and reenforcement supporting device, a steel blade, means for drawing the blade through unset concrete, asphalt, or like material, the top of said blade on a level with or below the surface of said material, supports for said blade, said supports resting on and guided by the side forms of the material, and runners extending parallel with the blade and aligning reenforcement material below the incision made by the blade as the latter is drawn forward.

2. In combination road building machinery, in attachment to a concrete mixer, a blade of hollow construction, a jointed tape of suitable material adapted to pass through the blade, means for feeding the tape, a template supporting the blade, said template and blade supported on the side forms of the construction whereon they are used, and means to aline and support reenforcement members, below the incision made by the blade, as the device is moved over the surface of the road.

3. In a grooving device for highways and the like, a blade adapted to cleave the said highway pavement or the like, before same has mechanically set, and means to support and aline reenforcement material below the cleavage plane as the latter is formed.

4. The hereindescribed process of forming cleavage planes in and reenforcing highways, pavements, floors, roofs and other like constructions, by first mechanically cleaving the material before same has attained a mechanical set, and at the same time, alining reenforcement material below the cleavage plane, and by then laying or depositing a ribbon or jointed tape in the cleavage plane.

5. A blade of hollow steel, a jointed tape, means for feeding the tape through the blade, means for supporting and guiding the blade, means for moving the blade through semi-solid or unset construction material below the finished surface thereof, and means for alining reenforcement below the cleavage plane formed by the blade before the said materials have attained a mechanical set, substantially as and for the purpose set forth.

6. The process of building a surfacing structure from plastic material consisting in progressively pouring and finishing the material over a division producing member, and moving said member forwardly in the material as the pouring and finishing progresses.

7. The process of building a surfacing structure from plastic material consisting in progressively pouring and finishing the material over a division producing member, moving said member forwardly in the material as the pouring and finishing progresses, and positioning joint material in said division in rear of said member.

8. The process of building a surfacing structure from plastic material consisting in progressively pouring and finishing the material over a division producing member, moving said member forwardly in the material as the pouring and finishing progresses, and using said member to deliver material into said division.

9. The process of building a surfacing structure from plastic material consisting in pouring and finishing material over a blade, and moving said blade forwardly as the pouring and finishing progresses to produce a division in the structure.

10. The process of building a surfacing structure from plastic material consisting in pouring and finishing material over a blade, moving said blade forwardly as the pouring and finishing progresses to produce a division in the structure, and positioning material in said division in rear of said blade.

11. The process of building a surfacing structure from plastic material consisting in pouring and finishing material over a blade, moving said blade forwardly as the pouring and finishing progresses to produce a division in the structure, and using said blade to deliver material into said division.

12. The process of producing a joint in a plastic surfacing structure, consisting in moving a member in the material to produce a division therein, using said member for delivering material into said division, and finishing the material over said member.

13. The process of producing a joint in a plastic surfacing structure consisting in moving an elongated blade longitudinally of itself in the material to produce a division therein, and finishing the surface of the material over said blade.

14. The process of producing a joint in a plastic surfacing structure consisting in moving an elongated blade in the material to produce a division therein, finishing the material over said blade, and using said blade for delivering material into said division.

15. An apparatus of the character described including a blade movable in plastic material to produce a division therein and having a passage for the movement of material therethrough into said division, and means for supplying material into said passage to enter said division and provide a weakened line along which the material, when hardened, will break.

16. An apparatus of the character described comprising a carriage movable on the side forms of a road or the like, and a blade trailing from said carriage and constructed and arranged in order that the plastic material may be poured and finished over said blade and so that the blade may be pulled forwardly with said carriage as the pouring and finishing progresses, to produce a division in the material as the carriage is moved forwardly.

17. An apparatus of the character described comprising a carriage, a hollow blade carried thereby to move in plastic material, and a supply of tape mounted on the carriage for the movement of the tape through said blade.

18. An apparatus of the character described comprising a blade movable in plastic material to produce a division therein, and a finisher for the material arranged above and operable over said blade.

19. The method of producing a joint or traffic line in concrete consisting in moving a blade forwardly in the concrete to produce a separation therein, and depositing a strip in said separation in rear of the blade.

20. The method of producing a joint or traffic line in concrete consisting in first separating the aggregate of the plastic concrete and then depositing a strip in the concrete along the line of said separation.

21. A device for producing a joint in concrete comprising a blade adapted to move in the plastic concrete, said blade being of a desired cross-section to produce a cut of similar section in the concrete, and said blade having a passage for delivering material into said cut, and means for delivering material into said passage to fill said cut and produce a weakened line along which the concrete, when hardened, will break.

22. An apparatus for producing a joint in concrete comprising a blade movable in the plastic concrete to produce a separation thereof and having a passage, and a supply of tape extending into and through said passage to be deposited in said separation.

23. The method of producing a joint in a concrete road consisting in positioning, by an advance movement as the building of the road progresses, a continuous strip above the sub-base of a road under construction, maintaining said strip in position at the successive advanced localities of pouring and finishing of the plastic concrete in building the road, and releasing said strip in rear of the locality of the pouring and finishing.

24. An apparatus for producing a joint in a concrete road comprising a carriage movable over the sub-base of a road under construction, means carried by the carriage for supplying a continuous strip above said sub-base by an advance movement of the carriage as the building of the road progresses, and means for maintaining said strip in position at the successive advanced localities of pouring and finishing of the plastic concrete in building the road and adapted to be advanced with said carriage to release the strip in rear of the locality of the pouring and finishing.

25. An apparatus for producing a joint in a concrete road comprising a carriage movable over the sub-base of a road under construction, means carried by the carriage for supplying a continuous strip in substantially a vertical plane above said sub-base by an advance movement of the carriage as the building of the road progresses, and means carried by said carriage for maintaining said strip in position in said plane at the locality of pouring and finishing of the plastic concrete in building the road.

26. An apparatus of the character described including a member movable in plastic concrete to produce a division therein and having a passage for the delivery of material into said division, and a finisher for the surface of the plastic material arranged above and operable over said member.

27. An apparatus of the character described comprising an elongated blade constructed and arranged in order that plastic material may be poured and finished over said blade, and means for pulling said blade forwardly as the pouring and finishing progresses, to leave a division in the material.

In testimony whereof I have signed my name to this specification.

PETER J. McINERNEY.